United States Patent Office 3,647,828
Patented Mar. 7, 1972

3,647,828
DYESTUFFS OF THE ANTHRAQUINONE SERIES
Ernst Spietschka, Oberauroff, and Friedrich Ische, Kelkheim, Taunus, Germany, assignors to Farbwerke Hoechst Aktiengesellschaft vormals Meister Lucius & Bruning, Frankfurt am Main, Germany
No Drawing. Filed June 3, 1970, Ser. No. 43,239
Claims priority, application Germany, June 11, 1969,
P 19 29 564.8
Int. Cl. C09b *1/50*
U.S. Cl. 260—380    7 Claims

ABSTRACT OF THE DISCLOSURE

Dyestuffs of the general formula

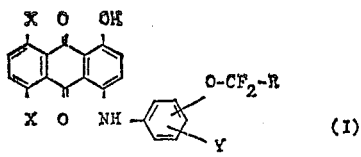

in which the one X is hydroxy and the other X is nitro or amino or alkylamino optionally substituted by halogen, hydroxy, alkoxy, or cyano, R is fluorine or alkyl optionally substituted by fluorine and/or chlorine, and Y is hydrogen, halogen, alkyl or alkoxy optionally substituted by fluorine or hydroxy, the dyestuffs being suitable for dyeing, coloring or printing polyester material.

---

The present invention relates to novel dyestuffs of the anthraquinone series of the general formula

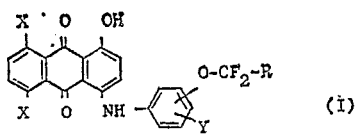

in which the one X stands for hydroxy and the other X stands for nitro or amino or alkylamino which may be substituted by halogen, hydroxy or cyano, R stands for fluorine or alkyl which may be substituted by fluorine and/or chlorine, and Y stands for hydrogen, halogen, alkyl or alkoxy which may be substituted by fluorine or hydroxy, and to a process for preparing them.

It has been found that novel sparingly water-soluble anthraquinone dyestuffs of the general formula

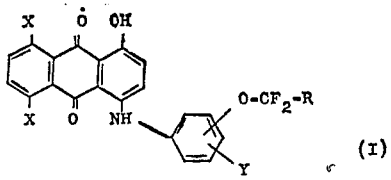

in which the one X stands for hydroxy and the other X stands for nitro or amino or alkylamino which may be substituted by halogen, hydroxy, alkoxy or cyano, R stands for fluorine or alkyl which may be substituted by fluorine and/or chlorine, and Y stands for hydrogen, halogen, alkyl or alkoxy which may be substituted by fluorine or hydroxy, are obtained by reacting an anthraquinone derivative of the formula

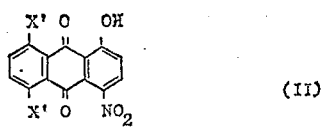

in which the one X' stands for hydroxy and the other X' for nitro or amino, with an aniline derivative of the general formula

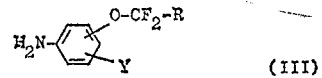

in which R and Y are defined as above, with the formation of dyestuffs of the formula

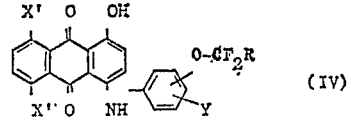

in which X', Y and R are defined as above, and optionally reducing a nitro group which may still be present to the amino group or reacting it with an alkyl-amine, halogen-alkylamine, hydroxy-alkylamine, alkoxy-alkylamine or cyano-alkylamine.

As starting compounds of the above Formula II there are mentioned 1,5 - dihydroxy-4,8-dinitro-anthraquinone, 1,8-dihydroxy-4,5-dinitro-anthraquinone, 1,5-dihydroxy-4-nitro-8-amino-anthraquinone or 1,8-dihydroxy-4-nitro-5-amino-anthraquinone, as well as mixtures of these compounds. The aniline derivatives of the Formula III to be used are, for example, the following:

2, 3- or 4-trifluoromethoxy-aniline,
2-, 3- or 4-pentafluoroethoxy-aniline,
2-, 3-, or 4-(1',1',2'-tetrafluoromethoxy)-aniline,
4-(1',1',2',2',3',3'-hexafluoropropoxy)-aniline,
3-(1',1',2'-trifluoroethoxy))-aniline,
4-nonafluoro-butoxy-aniline,
2,4-bis-trifluoro-methoxy-aniline,
3-(1',1',2'-trifluoro-2'-chloro-ethoxy)-aniline,
3-chloro-4-trifluoromethoxy-aniline,
3-methoxy-4-trifluoromethoxy-aniline and
3-(1',1'-difluoro-2',2'-dichloro-ethoxy)-aniline.

The anthraquinone derivatives of the Formula II are reacted with the aniline derivatives of the Formula III, advantageously in an excess of the amine used or in an inert solvent, in this latter case the amine being used in the calculated amount or in a small excess. Suitable solvents are, for example, ethanol, butanol, glycol and ethers thereof, benzene, chlorobenzene, 1,2-dichlorobenzene, nitrobenzene or dimethylformamide. The reaction temperature is, advantageously, within a range of from about 100° to 250° C., preferably from about 120° to 160° C. where required, pressure is applied.

The anthraquinone derivatives of the above Formula IV are isolated by diluting the reaction mixture with water, methanol or benzene, and by separating the product by filtration, optionally after the solvent has been distilled off. These anthraquinone derivatives of the Formula IV can be used as disperse dyestuffs.

Where required, the nitro group which may still be present is reduced to the amino group, suitably by means of sodium sulfide in an aqueous-alcoholic solution or suspension. The nitro group may, however, also be exchanged in known manner for the substituted amino group by heating it with alkylamines, halogen-alkylamines, hydroxy-alkylamines, alkoxy-akylamines or cyano-alkylamines.

The dyestuffs of the invention are suitable for dyeing and coloring fibers, films or sheets made of hydrophobic material, for example polyesters, especially polyethyleneterephthalates, in an aqueous dispersion, blue shades having very good fastness properties, especially high fastness to thermofixing and thermosetting. Dyestuffs of the above Formula I in which the one X stands for a hydroxy group and the other X stands for a nitro or amino group, have especially advantageous properties as regards absorption by polyester material and fastness to heat treatment.

Compared with the dyestuffs known from French Pat. No. 1,437,525, which contain a trifluoromethyl-phenylamino group, the dyestuffs of the invention are distinguished by a better fastness to heat treatment.

For producing fast dyeings and colorations, the polyester material is treated with the dyestuffs concerned in the presence of carriers at temperatures of from 80° to 110° C. or in the absence of carriers at temperatures of from 110 to 140° C. For the production of prints aqueous printing pastes are applied to the polyester fabric which is subsequently steam-treated in the presence of a carrier at temperatures of from 95° to 110° C. or in the absence of a carrier at temperatures of from 120 to 140° C.

Dyeing or printing may also be effected according to the so-called Thermosol process by subjecting the padded or printed goods for a short time to a dry heat treatment at a temperature of from 180° to 200° C. The dyestuffs of the invention can also be used successfully for coloring polyethylene-terephthalates in the dope.

The following examples serve to illustrate the invention, the parts and percentages being by weight unless stated otherwise.

EXAMPLE 1

17 parts of 1,5-dihydroxy-4,8-dinitro-anthraquinone and 21 parts of 3-(1',1',-2',2'-tetrafluoro-ethoxy)aniline were introduced into 200 parts of glycol and the mixture was heated to 195–197° C. for 5 hours. The mixture was cooled and introduced into 1,000 parts of ice water. The precipitated dyestuff was suction-filtered, washed with water and dried. 25 parts (98.5% of the theory) of a dyestuff of the formula

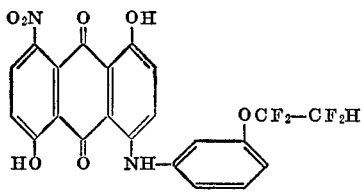

were obtained. The dyestuff dyed and colored fibres and films of polyethylene-terephthalate a blue shade having good fastness properties.

*Analysis.*—$C_{22}H_{12}F_4N_2O_7$ (molecular weight: 492.3): Calculated (percent): N, 5.69; F, 15.44. Found (percent): N, 5.8/5.6; F, 15.4/15.1.

In the same manner there were obtained:

from 1,8-dihydroxy-4,5-dinitro-anthraquinone and 3-(1',1',2',2'-tetrafluoro-ethoxy)-aniline a dyestuff of the formula

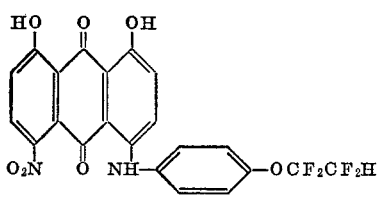

which gave a blue shade and
from 1,5-dihydroxy-4,8-dinitro-anthraquinone and 4-(1',1',2',2'-tetrafluoro-ethoxy)aniline a dyestuff of the formula

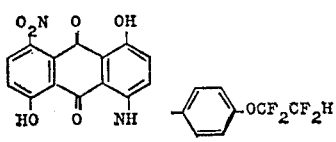

which also gave a blue shade.

EXAMPLE 2

10 parts of the dyestuff obtained according to Example 1, 2 parts of sodium hydroxide and 20 parts of ethanol were heated to 50° C. for half an hour, the mixture was then cooled to room temperature and diluted with 30 parts of water. 10 parts of crystallized sodium sulfide were portionwise added to the mixture and the whole was heated at the boil for 1 hour. The dyestuff was precipitated by adding a sodium bisulfite solution, then suction-filtered, washed and dried. 8.5 parts (90.5% of the theory) of a dyestuff of the formula

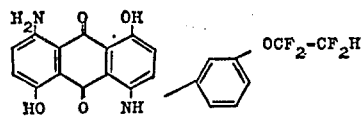

were obtained. This dyestuff produced on fibres, sheets and films made of polyethylene-terephthalate blue dyeings and colorations fast to light and washing and very fast to thermo-fixing and thermosetting.

In the same manner there were obtained:
from 1,8-dihydroxy-4,5-dinitro-anthraquinone and 3-(1',1',2',2'-tetrafluoro-ethoxy)-aniline a dyestuff of the formula

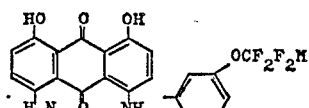

which gave a blue shade, and
from 1,5-dihydroxy-4,8-dinitro-anthraquinone and 4-(1',1', 2', 2'-tetrafluoro-ethoxy)-aniline a dyestuff of the formula

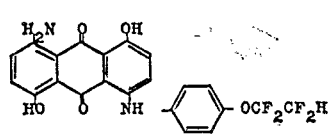

which also gave a blue shade.

EXAMPLE 3

10 parts of the dyestuff prepared according to Example 1, 50 parts of ethylamine and 50 parts of ethanol were heated to 100°–110° C. for 5 hours in an autoclave. The reaction mixture was cooled, diluted with ice water and the precipitate was suction-filtered, washed and dried. 9.5 parts (98% of the theory) of a dyestuff of the formula

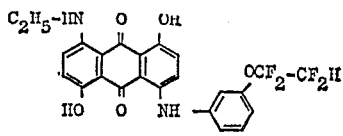

were obtained. The dyestuff dyed and colored fibers and sheets or films made from polyethylene-terephthalate blue shades having good fastness properties.

EXAMPLE 4

17 parts of a mixture of equal parts of 1,5-dihydroxy-4,8-dinitro-anthraquinone and 1,8-dihydroxy-4,5-dinitro-anthraquinone were introduced together with 19 parts of 3-(1',1',2'-trifluoro-ethoxy)-aniline into 200 parts of nitrobenzene. The mixture was heated to 150–160° C. for 6 hours, then cooled and diluted with methanol. The dyestuff was suction-filtered, washed and dried. 23 parts (94.5% of the theory) of a mixture of dyestuffs of the formulae

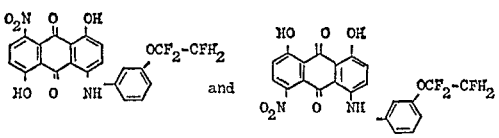

were obtained. This dyestuff mixture produced on fibers, sheets and films made of polyethylene-terephthalate blue dyeings or colorations and prints having good fastness properties.

EXAMPLE 5

10 parts of the dyestuff mixture obtained according to Example 4 were reduced by means of sodium sulfide as disclosed in Example 2. A mixture of dyestuffs of the formulae

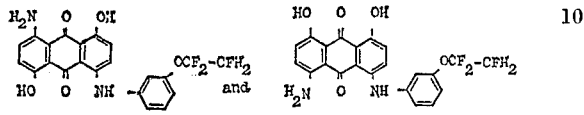

was obtained. It dyed and colored fibers, sheets and films made of polyethylene-terephthalate blue shades having good fastness properties.

EXAMPLE 6

17 parts of 1,8-dihydroxy - 4,5 - dinitro-anthraquinone and 22.5 parts of 3-(1',1',2'-trifluoro - 2' - chloro-ethoxy)-aniline were introduced into 200 parts of dimethylformamide, and the mixture was heated to 150° C. for 4 hours. The mixture was then cooled and diluted with ice water. The precipitated dyestuff was suction-filtered, washed and dried.

24 parts (91.5% of the theory) of a dyestuff of the formula

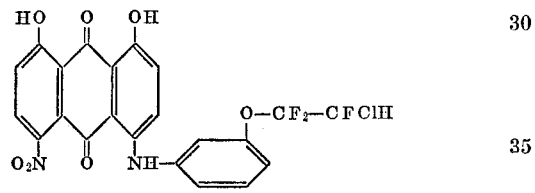

were obtained. This dyestuff produced on fibers, sheets and films made of polyethylene-terephthalate blue dyeings, colorations and prints having good fastness properties.

EXAMPLE 7

10 parts of the dyestuff obtained according to Example 6 were heated to 160° C. together with 100 parts of 3-methoxypropylamine until complete reaction was established with the aid of a thin-layer chromatogram. The mixture was then cooled, diluted with methanol, suction-filtered and the filter cake was washed and dried.

10.5 parts of a dyestuff of the formula

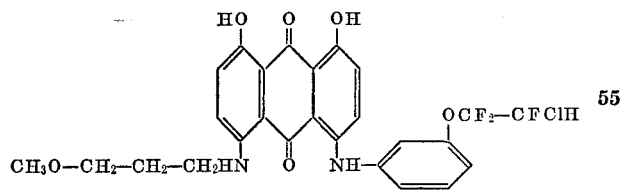

were obtained. The dyestuff dyed and colored fibers, sheets and films made of polyethylene-terephthalate a blue shade having good fastness properties.

EXAMPLE 8

10 parts of 1,5-dihydroxy-4-nitro-8-amino-anthraquinone and 30 parts of 3-(1',1',2',2'-tetrafluoro-ethoxy)-aniline were heated to 160° C. for 5 hours. The mixture was cooled, diluted with methanol and acidified by means of dilute sulfuric acid. After suction-filtration, washing and drying 12.5 parts (84% of the theory) of the dyestuff disclosed in Example 2 were obtained.

The following table shows further dyestuffs which could be prepared according to Examples 1, 4 and 6 or 2 and 5, as well as their shades on polyester material.

| Starting material | Aniline derivative | Reaction product according to Examples 1, 4 and 6 | Shade | Reduction product according to Examples 2 and 5 | Shade |
|---|---|---|---|---|---|
| 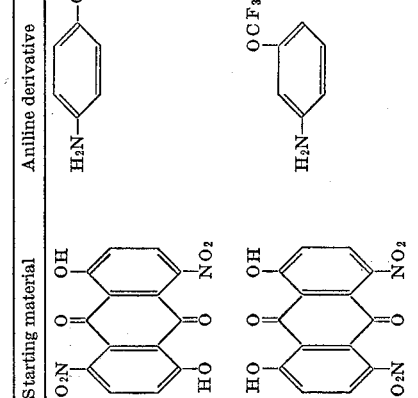 | 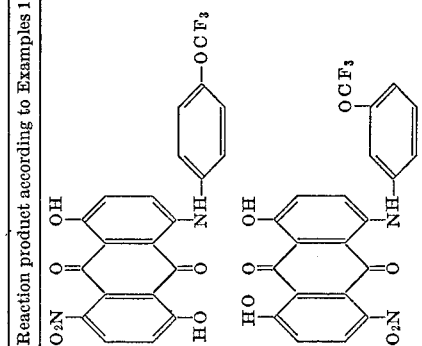 | 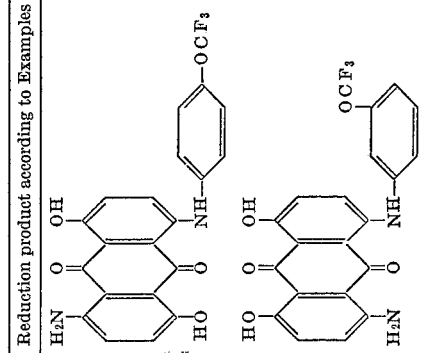 | Blue | | Blue |
| | | | | | Do. |

TABLE—Continued
| Starting material | Aniline derivative | Reaction product according to Examples 1, 4 and 6 | Shade | Reduction product according to Examples 2 and 5 | Shade |
|---|---|---|---|---|---|
| 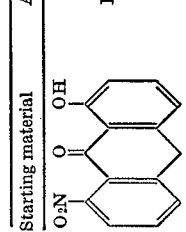 | 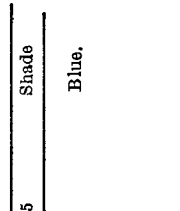 | 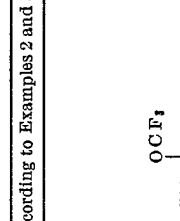 | Blue | 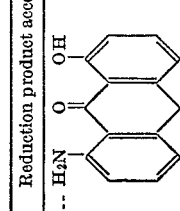 | Blue. |
| Same as above | 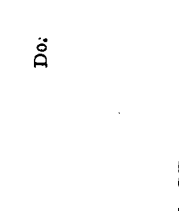 | 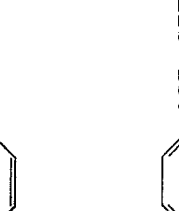 | do |  | Do. |
| Do | 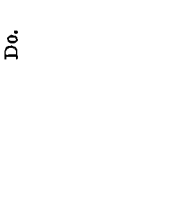 | 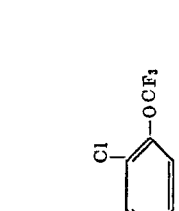 | do | 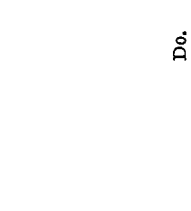 | Do. |
| Do |  | 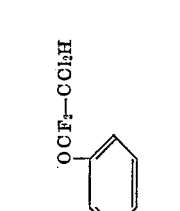 | do |  | Do. |
| 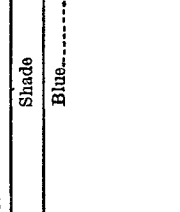 | 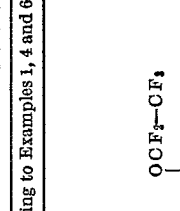 | 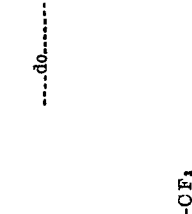 | do | 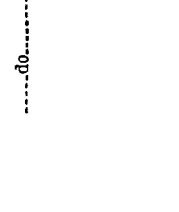 | Do. |
| 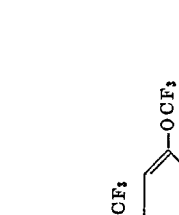 | 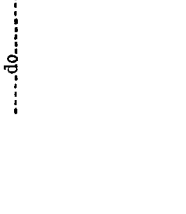 | 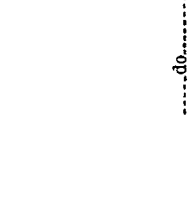 | do | 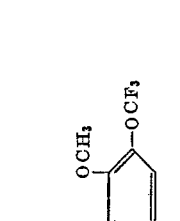 | Do. |

TABLE—Continued

| Starting material | Aniline derivative | Reaction product according to Examples 1, 4 and 6 | Shade | Reduction product according to Examples 2 and 5 | Shade |
|---|---|---|---|---|---|
| 2-nitro-1,4,5-trihydroxyanthraquinone (O₂N, OH, O, O, OH) | 4-(OCF₂CF₂H)-bromoaniline | 2-nitro-1,5-dihydroxy-4-[4-(OCF₂CF₂H)-2-bromoanilino]anthraquinone | Blue | 2-amino-1,5-dihydroxy-4-[4-(OCF₂CF₂H)-2-bromoanilino]anthraquinone | Blue |
| Same as above | 4-(OCF₂CF₂H)-chloroaniline | corresponding nitro compound with Cl substituent | do | corresponding amino compound with Cl substituent | Do. |
| Do. | 4-(OCF₂CF₂H)-methylaniline | corresponding nitro compound with CH₃ substituent | do | corresponding amino compound with CH₃ substituent | Do. |
| Do. | 3-(OCF₂CF₂H)-(O–CH₂–CH₂–OH)aniline | corresponding nitro compound with O–CH₂–CH₂–OH substituent | do | corresponding amino compound with O–CH₂–CH₂–OH substituent | Do. |

| Starting material | Amine | Reaction product | Shade |
|---|---|---|---|
| ![anthraquinone with O2N, OH, HO, NH-phenyl-OCF2CF2H] Prepared according to Example 1 | n-butylamine. | n-C4H9-HN, anthraquinone, OH, HO, NH-phenyl-OCF2CF2H | Greenish blue. |
| Same as above | β-Bromo-ethylamine. | Bn-CH2—CH2HN, anthraquinone, OH, HO, NH-phenyl-OCF2CF2H | Do. |
| Do | β-Hydroxy-propyl-amine. | CH3—CH(OH)—CH2—HN, anthraquinone, OH, HO, NH-phenyl-OCF2CF2H | Do. |
| Do | β-Cyano-ethylamine. | NC—CH2—CH2—HN, anthraquinone, OH, HO, NH-phenyl-OCF2CF2H | Do. |

We claim:
1. Dyestuffs of the general formula

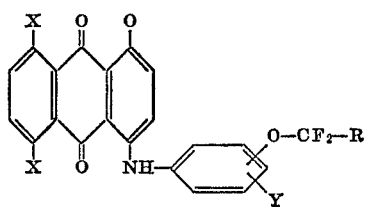

wherein one X is hydroxy and the other X is nitro, amino, lower alkylamino, halogen lower alkylamino, hydroxy lower alkylamino, lower alkoxy lower alkylamino, cyano lower alkylamine, R is fluorine, lower alkyl, fluorine lower alkyl, chlorine lower akyl or fluorine, chlorine, lower, alkyl and Y is hydrogen, halogen, lower alkyl, lower alkoxy, fluorine, lower alkoxy or hydroxy lower alkoxy.

2. A dyestuff of the formula

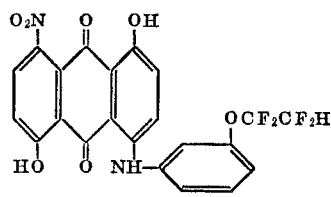

3. A dyestuff of the formula

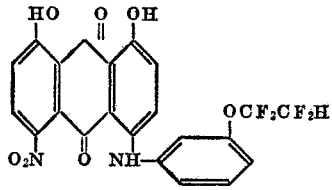

4. A dyestuff of the formula

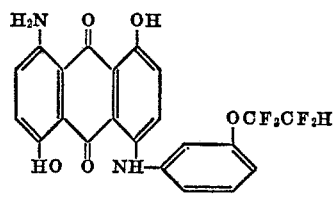

5. A dyestuff of the formula

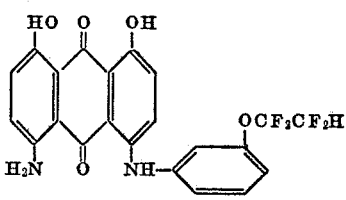

6. A dyestuff of the formula

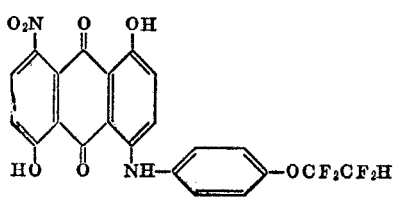

7. A dyestuff of the formula
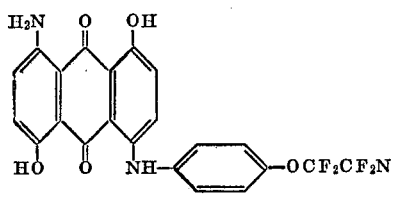
References Cited
FOREIGN PATENTS
1,142,136   5/1969   Great Britain _____ 260—380
LORRAINE R. WEINBERGER, Primary Examiner
R. GERSTL, Assistant Examiner
U.S. Cl. X.R.
8—39.40; 260—379, 575